United States Patent [19]

Larsson et al.

[11] Patent Number: 4,741,933
[45] Date of Patent: May 3, 1988

[54] PREPARATION OF FROZEN FOOD PRODUCT

[75] Inventors: Inger C. Larsson, Helsingborg; Anna M. Linse-Loefgren, Klippan, both of Sweden

[73] Assignee: Nestec S. A., Vevey, Switzerland

[21] Appl. No.: 807,548

[22] Filed: Dec. 11, 1985

[30] Foreign Application Priority Data

Jan. 21, 1985 [EP] European Pat. Off. ........ 85100597.5

[51] Int. Cl.⁴ .................... A23L 1/176; A23L 1/10; A21D 10/04
[52] U.S. Cl. .................... 426/291; 426/296; 426/92; 426/95
[58] Field of Search ............ 426/95, 289, 291, 292, 426/293, 294, 296

[56] References Cited

U.S. PATENT DOCUMENTS

| | | | |
|---|---|---|---|
| 2,716,608 | 8/1955 | Renish | 426/296 |
| 3,078,172 | 2/1963 | Libby | 426/293 |
| 3,169,069 | 2/1965 | Hanson et al. | 426/296 |
| 3,236,654 | 2/1966 | Lipka et al. | 426/289 |

FOREIGN PATENT DOCUMENTS 0959749  9/1982  U.S.S.R. .................... 426/496

OTHER PUBLICATIONS

English Language Translation of Soviet Patent No. 959,744 (9/1982).

*Primary Examiner*—Jeanette Hunter
*Attorney, Agent, or Firm*—Vogt & O'Donnell

[57] ABSTRACT

A process for preparing a frozen battered food piece which comprises moistening the surface of the food piece with water, applying a thin layer of flour on to the food piece, coating with a batter, prefrying and finally deep-freezing characterised in that the batter is a Tempura batter containing a heat-treated wheat flour which does not form any substantial gluten network and which has been prepared by milling and drying whole grains which have previously been heat-treated with steam.

15 Claims, No Drawings

PREPARATION OF FROZEN FOOD PRODUCT

The present invention relates to a process for preparing frozen battered food pieces.

When preparing frozen battered fish pieces, after the batter has been applied, the fish piece is subjected to a short prefrying step before being deep-frozen. While it is very desirable to produce a crispy product, unfortunately the batter coating often falls off during the prefrying step. It is well-known to apply a very thin layer of flour on to the fish piece before battering in order to help the batter to adhere to the food, and sometimes this application of flour is preceded by dipping the fish piece in water to moisten and soften the surface. However, even these steps do not prevent the batter coating falling off during the prefrying step in the production of a crispy product.

We have found that, by using a Tempura batter containing a specially heat-treated flour which does not form a gluten network, we can obtain a crispy product without the batter coating falling off during the prefrying process.

Accordingly, the present invention provides a process for preparing a frozen battered food piece which comprises moistening the surface of the food piece with water, applying a thin layer of flour on to the food piece, coating with a batter, prefrying and finally deep-freezing characterised in that the batter is a Tempura batter containing a heat-treated wheat flour which does not form any substantial gluten network and which has been prepared by milling and drying whole wheat grains which have previously been heat-treated with steam. The process is applicable to any type of food piece which may conveniently be battered, e.g., meat, vegetable or fish pieces but is particularly suitable for preparing frozen cod pieces. Conveniently, the frozen food piece is moistened with hot water or steam to deglaze and humidify the surface so that the thin layer of flour will be able to adhere to it. The amount of water picked-up by the food is usually from 2% to 3.5% by weight, preferably from 2.5% to 3.2% by weight and especially from 2.7% to 3.0% by weight based on the weight of food piece.

The flour which is applied to the food piece before coating with the batter may be any free flowing flour but is preferably a specially baked crumb material such as milled cracker meal. The amount of flour picked up by the food is usually from 5% to 11% by weight, preferably from 6% to 10% by weight and especially from 7% to 9% by weight based on the weight of food piece.

The amount of baking powder in the Tempura battermix may vary from 1.0% to 10% by weight based on the weight of the batter. Within this range, an increase in the amount of baking powder leads to an increase in the crispiness of the product but also to an increased reject level when the food piece is prefried. Therefore, the amount of baking powder chosen is a compromise which gives the desired crispiness and an acceptable reject level and is conveniently from 2.0% to 8.0% by weight, preferably from 3.0% to 7.0% by weight and especially from 3.5% to 6.0% by weight based on the weight of the battermix. The other ingredients of the Tempura battermix are those usually present, for example, flour, starch, salt, monosodium glutamate, mustard and pepper, etc. The amount of heat-treated wheat flour present in the Tempura battermix may be within the range of from 40% to 75% by weight, preferably from 45% to 70% by weight and especially from 50% to 65% by weight based on the weight of the battermix. The amount of batter picked up by the food piece is usually from 50% to 75% by weight, preferably from 55% to 70% by weight and especially from 60% to 68% by weight based on the weight of the food piece.

Any commonly used frying oil may be used for prefrying the battered food pieces, but preferably soy oil is used. With other frying oils it is usually necessary to add an emulsifier, such as lecithin, to lower the interfacial tension between the oil and the batter in order to obtain a crispy product. The amount of oil uptake by the battered food piece is usually from 7.5% to 20% by weight, preferably from 10% to 18% and especially from 12% to 16% by weight based on the weight of the battered food piece.

The prefrying process is usually carried out at a temperature from 170° C. to 210° C. and preferably from 180° C. to 200° C. for a period of time from 15 to 60 seconds and preferably from 20 to 40 seconds.

After prefrying, the battered food piece is deep-frozen and packaged by conventional methods.

The present invention will now be further illustrated by the following Example.

EXAMPLE 1

Frozen cod fish blocks weighing 7.5 kg were sawn by band saws into 252 portions each weighing 28 g and having dimensions of 84×10×33 mm.

The frozen portions were fed onto a conveyor belt and deglazed with steam from steam tubes positioned above and below the belt. The steam pressure was adjusted so that the portions were sufficiently humidified with no dry spots and no excess water.

After being deglazed, the fish portions were immediately transported to a preduster where milled cracker meal 454 was applied and air blowers at the outfeed end blew off any excess so that 2.3 g remained on the surface of each fish portion.

The predusted fish portions were then transported to a batter applicator containing a batter which had been prepared in a Pearce mixer by mixing with water, a battermix containing the following ingredients:

| | |
|---|---|
| Heat-treated wheat flour, Hills & Partridge | 57.68% |
| Maize starch | 25.40% |
| Salt | 5.00% |
| Baking powder | 4.72% |
| Monosodium glutamate | 3.00% |
| Colman's mustard | 3.00% |
| White pepper | 1.20% |

The batter prepared contained 43.75% battermix and 56.25% water.

The batter was applied so that the pick-up was 18.0 g on each fish portion. Air blowers at the outfeed end blew off any excess batter. The fish portions were then transported to a prefryer containing soy oil where the belt speed was adjusted to allow prefrying for 30 seconds at a temperature of 190° C. so that the uptake of soy oil was 7.3 g on each battered cod steak. The prefried battered cod steaks obtained have a very desirably crispy texture and they were afterwards deep-frozen and packaged.

COMPARATIVE EXAMPLE

By carrying out a similar procedure to that described in Example 1 but using a conventional Tempura batter containing the same amount of ordinary wheat flour instead of the heat-treated wheat flour used therein, the prefried battered cod steaks obtained had an undesirable chewy texture.

What is claimed is:

1. A process which comprises:
    preparing a Tempura batter containing a heat-treated wheat flour which does not form any substantial gluten network;
    coating a flour coated food piece with the batter; and
    prefrying the batter coated food piece.

2. A process according to claim 1 wherein the heat-treated wheat flour has been prepared by milling and drying whole wheat grains subsequent to heat treatment with steam.

3. A process according to claim 1 wherein the batter is comprised of a battermix of the heat-treated flour and of baking powder with the baking powder being in an amount of from 1.0% to 10% by weight based upon the weight of the battermix.

4. A process for preparing battered food pieces comprising:
    coating food pieces with flour;
    coating the flour coated food pieces with a Tempura batter comprised of a battermix containing a flour which is heat-treated wheat flour which does not have any substantial gluten network and containing baking powder in an amount of from 1.0% to 10% by weight based upon the weight of the battermix; and
    prefrying the flour and batter coated food pieces.

5. A process according to claim 4 wherein the flour of the battermix consists essentially of the heat-treated wheat flour.

6. A process according to claim 4 wherein the baking powder is in an amount of from 2.0% to 8.0% by weight based upon the weight of the battermix and the heat-treated wheat flour is in an amount of from 40% to 75% by weight based upon the weight of the battermix.

7. A process according to claim 6 wherein the prefrying is carried out in an oil at a temperature of from 170° C. to 210° C. for a period of time of from 15 seconds to 60 seconds.

8. A process according to claim 4 further comprising moistening the food pieces prior to coating with flour.

9. A process according to claim 8 wherein the food pieces which are moistened are frozen.

10. A process according to claim 9 wherein the food pieces are pieces of cod.

11. A process according to claim 4 further comprising deep-freezing the prefried flour and batter coated food pieces.

12. A process for preparing battered food pieces comprising:
    coating food pieces with flour;
    coating the flour coated food pieces with a Tempura batter comprised of a battermix containing a heat-treated wheat flour which does not have any substantial gluten network in an amount of from 40% to 75% by weight based upon the weight of the battermix and containing baking powder in an amount of from 2.0% to 8.0% by weight based upon the weight of the battermix;
    prefrying the flour and batter coated food pieces in an oil at a temperature of from 170° C. to 210° C. for a period of time of from 15 seconds to 60 seconds; and
    deep-freezing the prefried flour and batter coated food pieces.

13. A process according to claim 12 further comprising moistening the food pieces prior to coating the food pieces with flour.

14. A food product comprising frozen prefried food pieces coated with a flour and a Tempura batter prepared with a heat treated wheat flour which does not have any substantial gluten network.

15. A Tempura batter which contains a heat-treated wheat flour which does not have any substantial gluten network.

* * * * *

UNITED STATES PATENT AND TRADEMARK OFFICE
CERTIFICATE OF CORRECTION

PATENT NO. : 4,741,933
DATED : May 3, 1988
INVENTOR(S) : Inger C. Larsson, et al.

It is certified that error appears in the above-identified patent and that said Letters Patent is hereby corrected as shown below:

On the title page, under the heading "FOREIGN PATENT DOCUMENTS", the U.S.S.R. reference identified as "0959749" should be --0959744--.

At column 2, line 3, "batter" should read --battermix--

At column 2, lines 18-19 and 60, "C." should read --C--.

At column 4, line 3 [line 3 of claim 7] "C." should read --C--.

At column 4, line 26 [line 13 of claim 12] "C." should read --C--.

Signed and Sealed this

Eighteenth Day of October, 1988

Attest:

DONALD J. QUIGG

Attesting Officer

Commissioner of Patents and Trademarks